United States Patent
Kao et al.

(10) Patent No.: US 10,554,119 B1
(45) Date of Patent: Feb. 4, 2020

(54) INVERTER APPARATUS WITH OVERCURRENT PROTECTION CONTROL

(71) Applicant: DELTA ELECTRONICS, INC., Taoyuan (TW)

(72) Inventors: Chao-Li Kao, Taoyuan (TW); Hung-Chieh Lin, Taoyuan (TW); Yi-Ping Hsieh, Taoyuan (TW); Jin-Zhong Huang, Taoyuan (TW); Chao-Lung Kuo, Taoyuan (TW); Po-Hsin Tseng, Taoyuan (TW); Hong-Wen Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/239,328

(22) Filed: Jan. 3, 2019

(30) Foreign Application Priority Data

Jul. 10, 2018 (CN) .......................... 2018 1 0751395

(51) Int. Cl.
*H02M 1/32* (2007.01)
*H02M 7/487* (2007.01)
*H02M 7/5387* (2007.01)
*H02M 1/08* (2006.01)

(52) U.S. Cl.
CPC ............... *H02M 1/32* (2013.01); *H02M 1/08* (2013.01); *H02M 7/487* (2013.01); *H02M 7/53871* (2013.01)

(58) Field of Classification Search
CPC .......... H02M 1/08; H02M 1/32; H02M 7/487; H02M 7/53871
USPC ....... 363/56.03, 4, 35, 37, 40–41, 55, 56.01, 363/56.02, 56.04, 56.05, 56.06, 56.07, 363/56.08, 131, 132
See application file for complete search history.

*Primary Examiner* — Nguyen Tran
*Assistant Examiner* — Monica Mata
(74) *Attorney, Agent, or Firm* — Muncy, Geissler, Olds & Lowe, P.C.

(57) ABSTRACT

An inverter apparatus with overcurrent protection control includes a first terminal of a DC input terminal connected to an AC output terminal through a first switch element and a second switch element, and a second terminal of the DC input terminal connected to the AC output terminal through a fourth switch element and a third switch element. An intermediate potential terminal is connected to a fifth switch element and a sixth switch element, and connected to the AC output terminal through the fifth switch element and the second switch element, and connected to the AC output terminal through the sixth switch element and the third switch element. When the control unit determines that the inverter apparatus is in an overcurrent state, the control unit controls a sequence of turning off the inverter apparatus to be the second switch element, the first switch element, and the sixth switch element.

12 Claims, 19 Drawing Sheets

US 10,554,119 B1

INVERTER APPARATUS WITH OVERCURRENT PROTECTION CONTROL

BACKGROUND

Technical Field

The present disclosure relates to an inverter apparatus with overcurrent protection control, and more particularly to an active neutral point clamped (ANPC) inverter apparatus with overcurrent protection control.

Description of Related Art

The statements in this section merely provide background information related to the present disclosure and do not necessarily constitute prior art.

The statements in this section merely provide background information related to the present disclosure and do not necessarily constitute prior art.

In the power electronics field, the requirement of lower costs, higher efficiency, and higher utilization is more and more attention. Especially, the inverter apparatus used for more and more electronic products has become the focus of research and development in recent years.

In particular, the active neutral point clamped (ANPC) inverter apparatus is suitable for the fields of solar energy and uninterruptible power supply (UPS) due to advantages of lower switch losses and EMI noises.

In general, a protection circuit needs to be provided to avoid damaging the ANPC inverter apparatus from the excessive current by turning off switch elements of the ANPC when the ANPC inverter apparatus operates in an overcurrent state. If the turned-off and turned-on sequence of the switch elements is inappropriately designed, however, the switch elements would be damaged due to the excessive voltage stress across the switch elements.

SUMMARY

In order to solve the above-mentioned problem, an inverter apparatus with overcurrent protection control is provided. The inverter apparatus with overcurrent protection control is coupled to an AC output terminal and a DC input terminal having an intermediate potential terminal. The inverter apparatus with overcurrent protection control includes a bridge arm assembly and a control unit. The bridge arm assembly includes a first bridge arm and a second bridge arm. The first bridge arm includes a first switch element, a second switch element, a third switch element, and a fourth switch element sequentially connected in series. The AC output terminal is coupled to the second switch element and the third switch element so that a first terminal of the DC input terminal is coupled to the AC output terminal through the first switch element and the second switch element, and a second terminal of the DC input terminal is coupled to the AC output terminal through the fourth switch element and the third switch element. The second bridge arm includes a fifth switch element and a sixth switch element connected in series. The intermediate potential terminal is coupled to the fifth switch element and the sixth switch element so that the intermediate potential terminal is coupled to the AC output terminal through the fifth switch element and the second switch element, and the intermediate potential terminal is coupled to the AC output terminal through the sixth switch element and the third switch element. The control unit provides plurality of control signals to control the bridge arm assembly. When the control unit determines that the inverter apparatus with overcurrent protection control is in an overcurrent state, the control unit sequentially turns off the second switch element, the first switch element, and the sixth switch element during a positive-half cycle, and sequentially turns off the third switch element, the fourth switch element, and the fifth switch element during a negative-half cycle.

In order to solve the above-mentioned problem, another inverter apparatus with overcurrent protection control is provided. The inverter apparatus with overcurrent protection control is coupled to an AC output terminal and a DC input terminal having an intermediate potential terminal. The inverter apparatus with overcurrent protection control includes a bridge arm assembly and a control unit. The bridge arm assembly includes a first bridge arm and a second bridge arm. The first bridge arm includes a first switch element, a second switch element, a third switch element, and a fourth switch element sequentially connected in series. The AC output terminal is coupled to the second switch element and the third switch element so that a first terminal of the DC input terminal is coupled to the AC output terminal through the first switch element and the second switch element, and a second terminal of the DC input terminal is coupled to the AC output terminal through the fourth switch element and the third switch element. The second bridge arm includes a fifth switch element and a sixth switch element connected in series. The intermediate potential terminal is coupled to the fifth switch element and the sixth switch element so that the intermediate potential terminal is coupled to the AC output terminal through the fifth switch element and the second switch element, and the intermediate potential terminal is coupled to the AC output terminal through the sixth switch element and the third switch element. The control unit provides a plurality of control signals to control the bridge arm assembly. When the control unit determines that the inverter apparatus with overcurrent protection control is in an overcurrent state, the control unit turns off the first switch element earlier than the sixth switch element during a positive-half cycle, and turns off the fourth switch element earlier than the fifth switch element during a negative-half cycle. When the control unit determines that the inverter apparatus with overcurrent protection control is not in the overcurrent state, the control unit turns on the sixth switch element earlier than the first switch element during the positive-half cycle, and turns on the fifth switch element earlier than the fourth switch element during the negative-half cycle.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
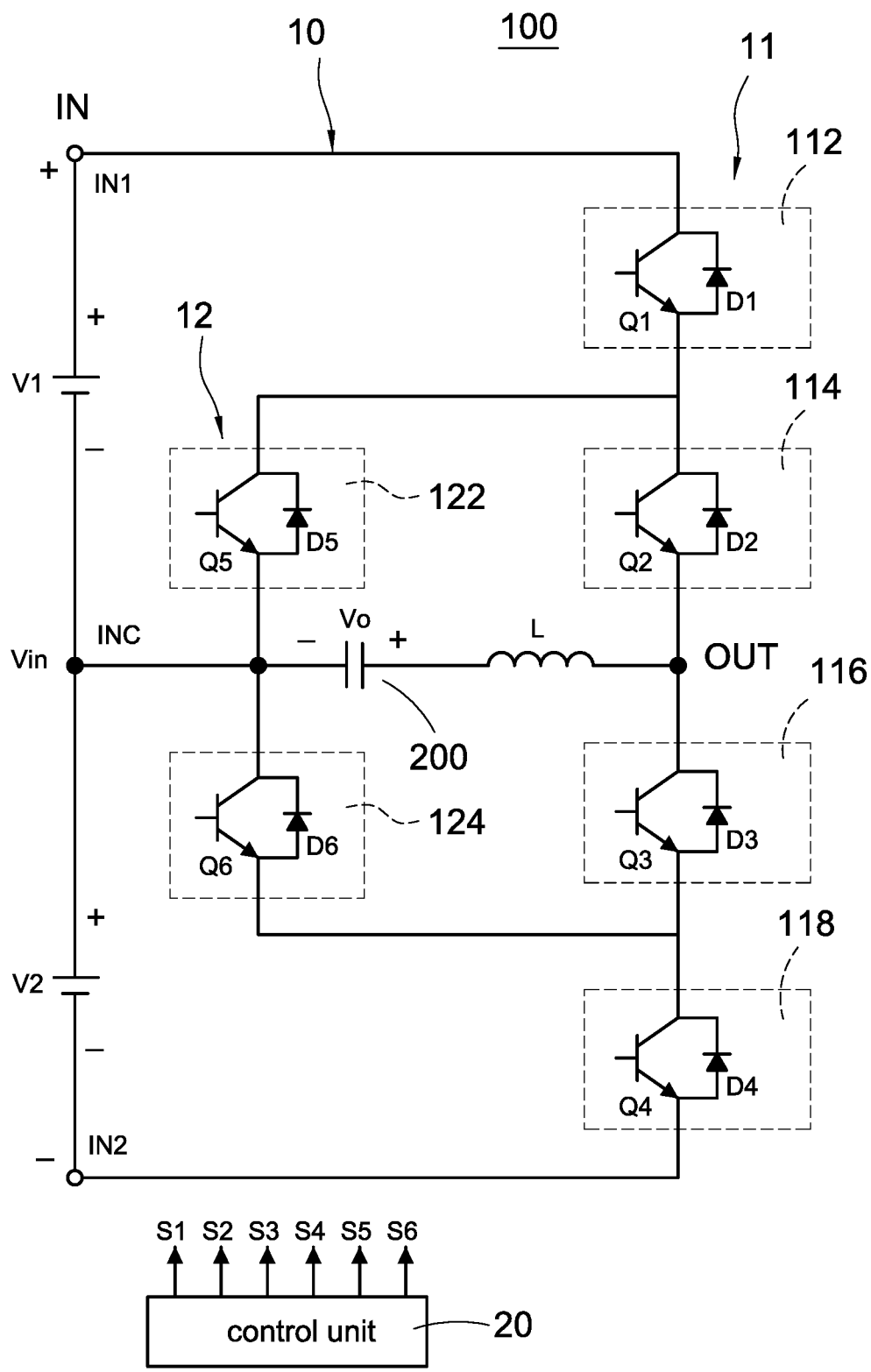
FIG. 1 is a circuit diagram of an inverter apparatus according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a circuit diagram of an inverter apparatus according to the present disclosure. The inverter apparatus 100 is coupled to a DC input terminal IN and an AC output terminal OUT, and the inverter apparatus 100 is provided to convert a DC power source Vin into an AC power output Vo so as to provide the required power for supplying a rear-end load 200. The DC input terminal IN includes a first terminal IN1, a second terminal IN2, and an intermediate potential terminal INC. The first terminal IN1 and the intermediate potential terminal INC are coupled to a first DC power V1 of the DC power source Vin; the second terminal IN2 and the intermediate potential terminal INC are coupled to a second DC power V2 of the DC power source Vin. The first DC power V1 and the second DC power V2 may be arbitrary DC voltage sources provided by, for example but not limited to, batteries or capacitors. In one embodiment, the AC output terminal OUT is connected in series to an output inductor L for filtering the AC power output Vo. The filtered AC power output Vo supplies power to a load 200, such as an electronic or electrical device used in AC power, or a utility grid. In one embodiment, the inverter apparatus 100 may be an active neutral point clamped (ANPC) inverter, and can be used as a single-phase inverter apparatus or a three-phase inverter apparatus by using three AC output terminals OUT of three inverter apparatuses.

The inverter apparatus 100 includes a bridge arm assembly 10 and a control unit 20, wherein the bridge arm assembly 10 includes a first bridge arm 11 and a second bridge arm 12. The first bridge arm 11 has a first switch unit 112, a second switch unit 114, a third switch unit 116, and a fourth switch unit 118 which are sequentially connected in series. The switch units 112-118 include the corresponding switch elements Q1-Q4 and diodes D1-D4 connected in inverse parallel with the switch elements Q1-Q4. In particular, the diode connected with the switch element can be a separate diode or a parasitic diode of the switch element. The AC output terminal OUT is coupled to the second switch unit 114 and the third switch unit 116 to make the first terminal IN1 be coupled to the AC output terminal OUT through the first switch unit 112 and the second switch unit 114, and to make the second terminal IN2 be coupled to the AC output terminal OUT through the fourth switch unit 118 and the third switch unit 116.

The second bridge arm 12 has a fifth switch unit 122 and a sixth switch unit 124 which are connected in series. The intermediate potential terminal INC is coupled to one end of the fifth switch unit 122 and one end of the sixth switch unit 124. The other end of the fifth switch unit 122 is coupled to the first switch unit 112 and the second switch unit 114; the other end of the sixth switch unit 124 is coupled to the third switch unit 116 and the fourth switch unit 118. The fifth switch unit 122 and the sixth switch unit 124 include the corresponding switch elements Q5-Q6 and diodes D5-D6 connected in inverse parallel with the switch elements Q5-Q6. In particular, the diode connected with the switch element can be a separate diode or a parasitic diode of the switch element. The intermediate potential terminal INC is coupled to the AC output terminal OUT through the fifth switch unit 122 and the second switch unit 114, and the intermediate potential terminal INC is coupled to the AC output terminal OUT through the sixth switch unit 124 and the third switch unit 116. The control unit 20 provides a plurality of control signals S1-S6 to respectively control the switch elements Q1-Q6 of the bridge arm assembly 10, thereby converting the DC power source Vin into the AC power output Vo. More specifically, the control unit 20 controls the first switch unit 112 and the second switch unit 114 to provide a main current path during a positive-half cycle of the AC power output Vo, controls the third switch unit 116 and the fourth switch unit 118 to provide a main current path during a negative-half cycle of the AC power output Vo, and controls the fifth switch unit 122 and the sixth switch unit 124 to provide a freewheeling path.

The inverter apparatus 100 can utilize different control types for converting the DC power source Vin into the AC power output Vo. The control unit 20 controls the sequence of turning off switch elements to decrease the output current Io of the inverter apparatus 100, thereby implementing the overcurrent protection when the inverter apparatus 100 with different control types operates in the overcurrent state. When the output current Io decreases to a predetermined lower current point, the control unit 20 further controls the sequence of turning on switch elements to make the inverter apparatus 100 operates in the normal state.

More specifically, the main technical spirit of the sequence for turning off switch units by the control unit 20 is that: the switch unit operated at high-frequency switching in the main current path is first turned off. Afterward, under a freewheeling path operation, the switch unit operated at low-frequency switching in the main current path or the switch unit in other freewheeling path is turned off. Finally, the switch unit in the freewheeling path is turned off. On the contrary, the sequence for turning on switch units by the control unit 20 is just opposite to that for turning off switch units. Therefore, the appropriate turned-off and turned-on sequence is designed to avoid damaging switch elements Q1-Q6 of the inverter apparatus 100 from the excessive voltage stress across the switch elements Q1-Q6. Three different control types of the inverter apparatus 100 as well as the corresponding control of turned-off and turned-on sequence will be further described below.

Figure 2:
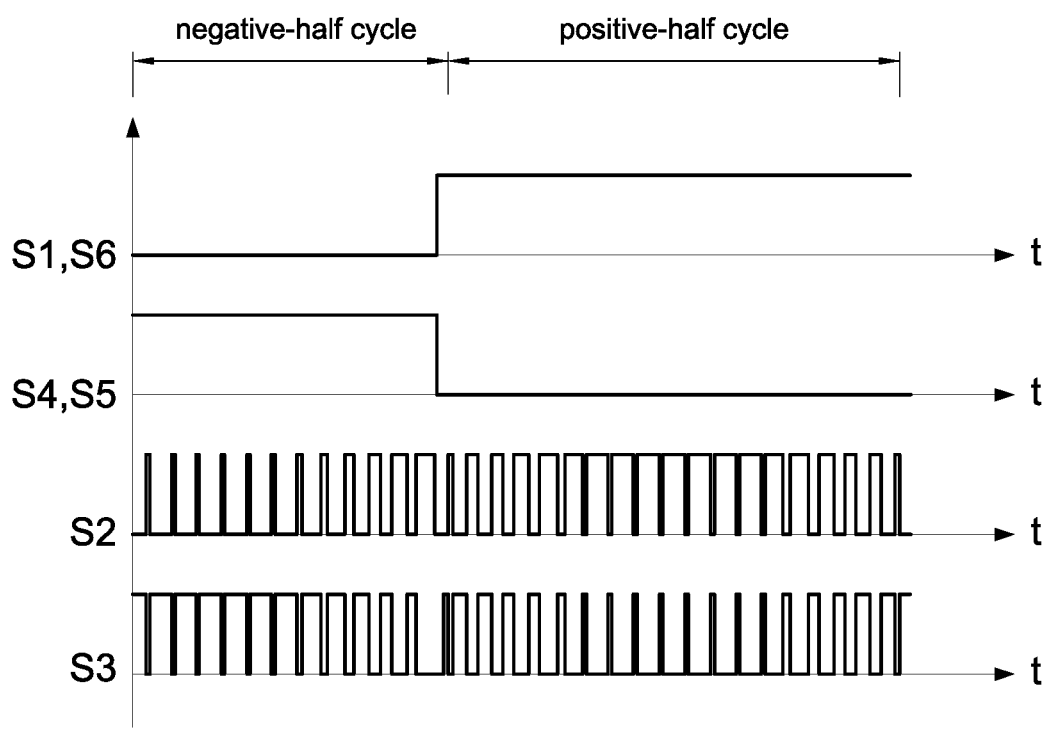
FIG. 2 is a schematic waveform of controlling the inverter apparatus according to a first control type of the present disclosure.

Please refer to FIG. 2, which shows a schematic waveform of controlling the inverter apparatus according to a first control type of the present disclosure, also refer to FIG. 1. The control signals (S1-S6) includes a first control signal S1 of controlling the first switch element Q1, a second control signal S2 of controlling the second switch element Q2, a third control signal S3 of controlling the third switch element Q3, a fourth control signal S4 of controlling the fourth switch element Q4, a fifth control signal S5 of controlling the fifth switch element Q5, and a sixth control signal S6 of controlling the sixth switch element Q6.

If the inverter apparatus 100 with first control type operates in a normal state (i.e., not in an overcurrent state), the second control signal S2 is a first switching signal, the third control signal S3 is a second switching signal complementary to the first switching signal, the first control signal S1 and the sixth control signal S6 are respectively a first level signal, and the fourth control signal S4 and the fifth control signal S5 are respectively a second level signal during a positive-half cycle. Alternatively, the second control signal S2 is a third switching signal, the third control signal S3 is a fourth switching signal complementary to the third switching signal, the fourth control signal S4 and the fifth control signal S5 are respectively the first level signal, and the first control signal S1 and the sixth control signal S6 are respectively the second level signal during a negative-half cycle.

In one embodiment, the above-mentioned switching signal may be a pulse-width modulation (PWM) signal. Moreover, a level value of the first level signal is higher than that of the second level signal, and the level value of the first level signal and that of the second level signal are not limited to specific values as long as the level value of the first level signal is high enough to turn on the switch elements Q1-Q6 and the level value of the second level signal low enough to turn off the switch elements Q1-Q6.

Figure 3A:
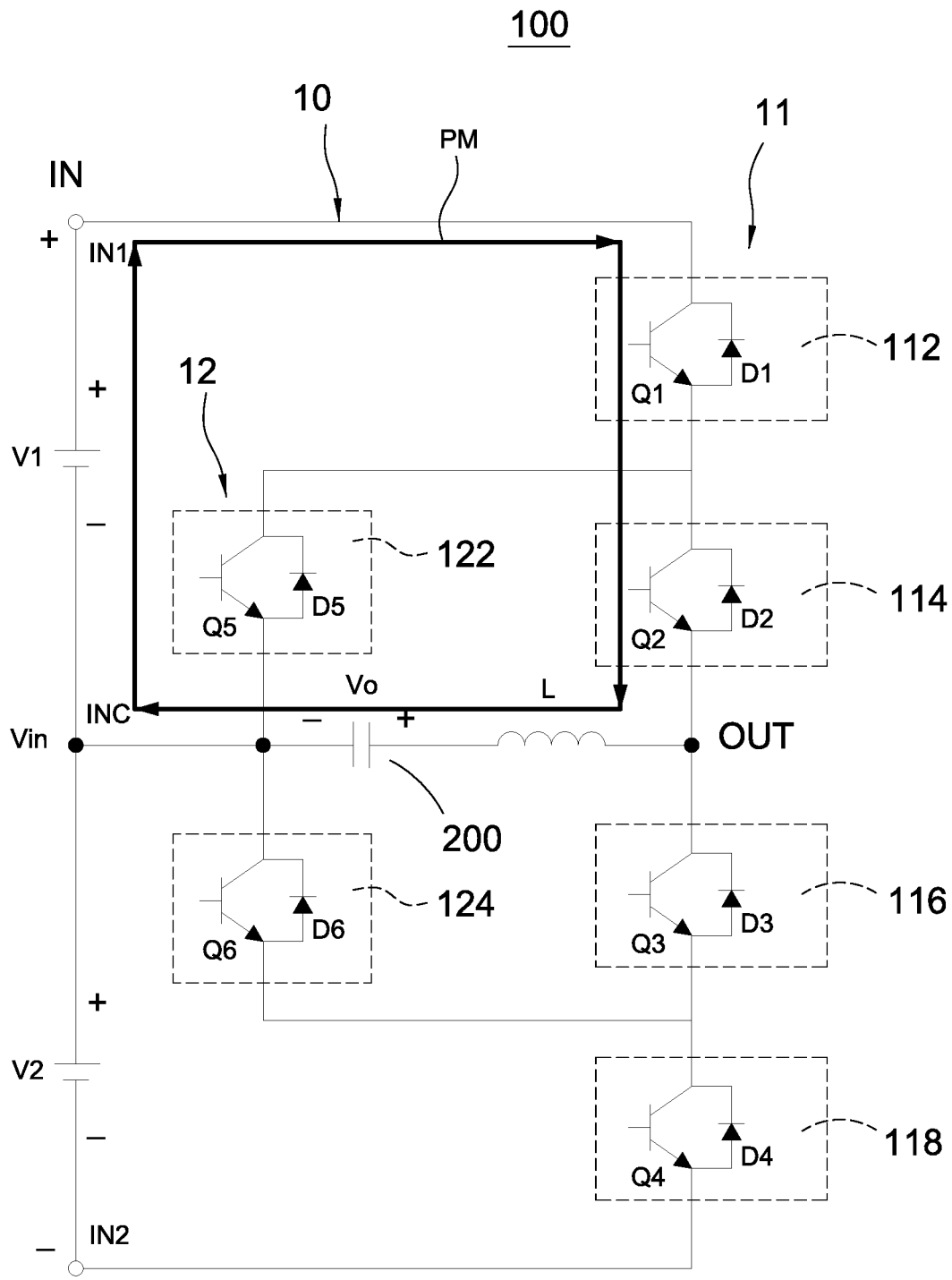
FIG. 3A is the circuit diagram of the inverter apparatus showing a main current path during a positive-half cycle according to the first control type of the present disclosure.
Figure 3B:
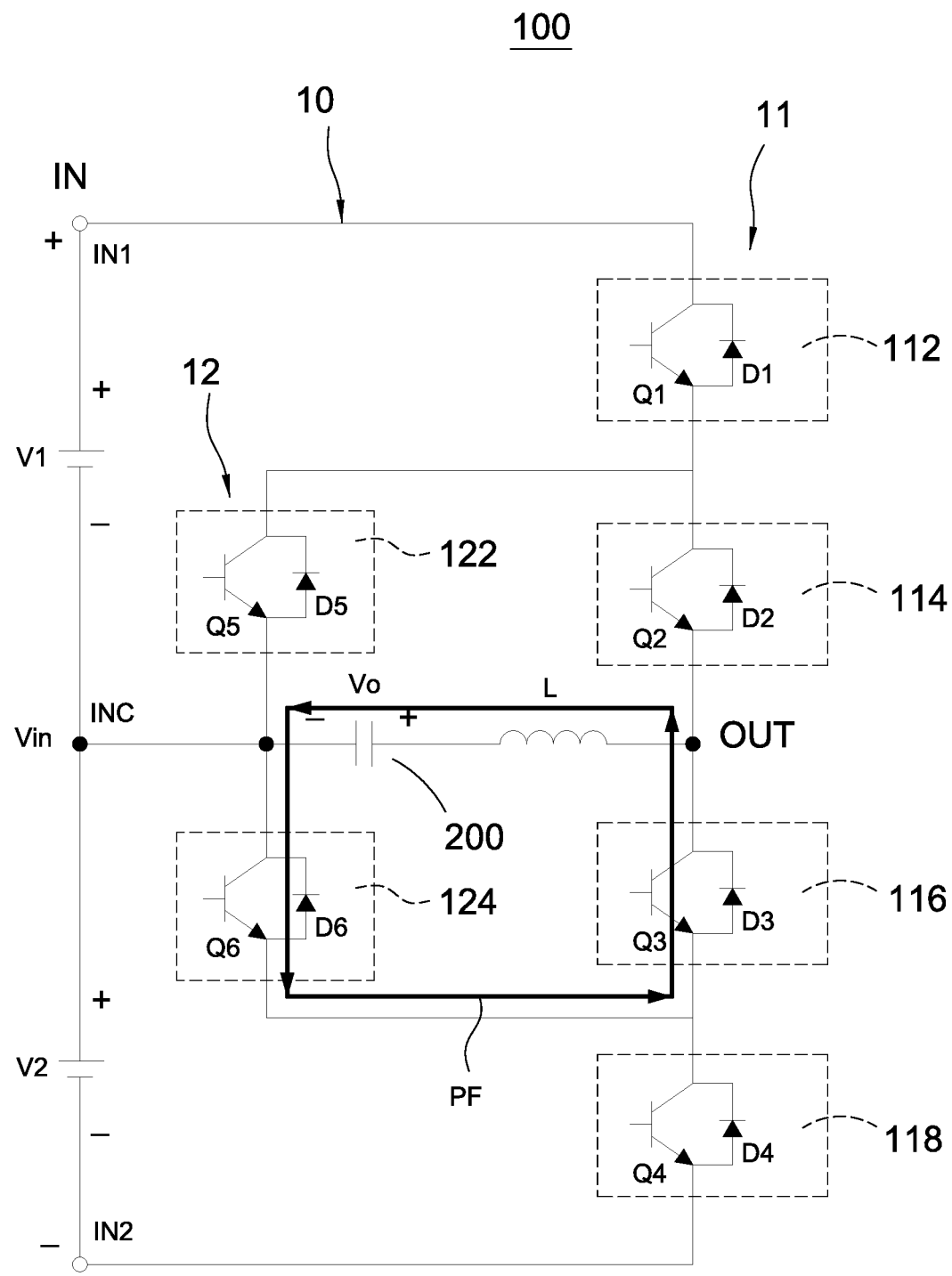
FIG. 3B is the circuit diagram of the inverter apparatus showing a freewheeling current path during the positive-half cycle according to the first control type of the present disclosure.
Figure 3C:
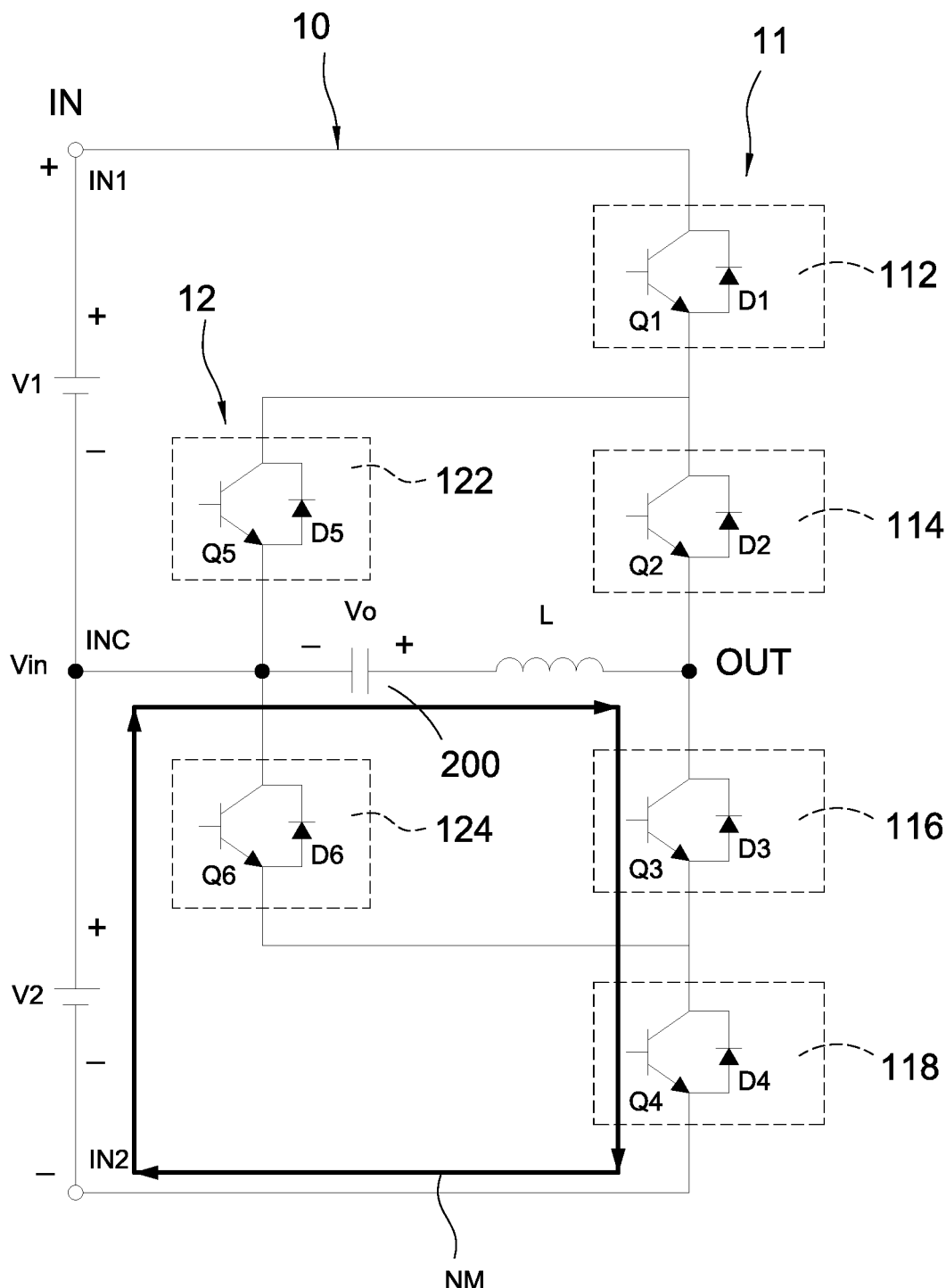
FIG. 3C is the circuit diagram of the inverter apparatus showing a main current path during a negative-half cycle according to the first control type of the present disclosure.
Figure 3D:
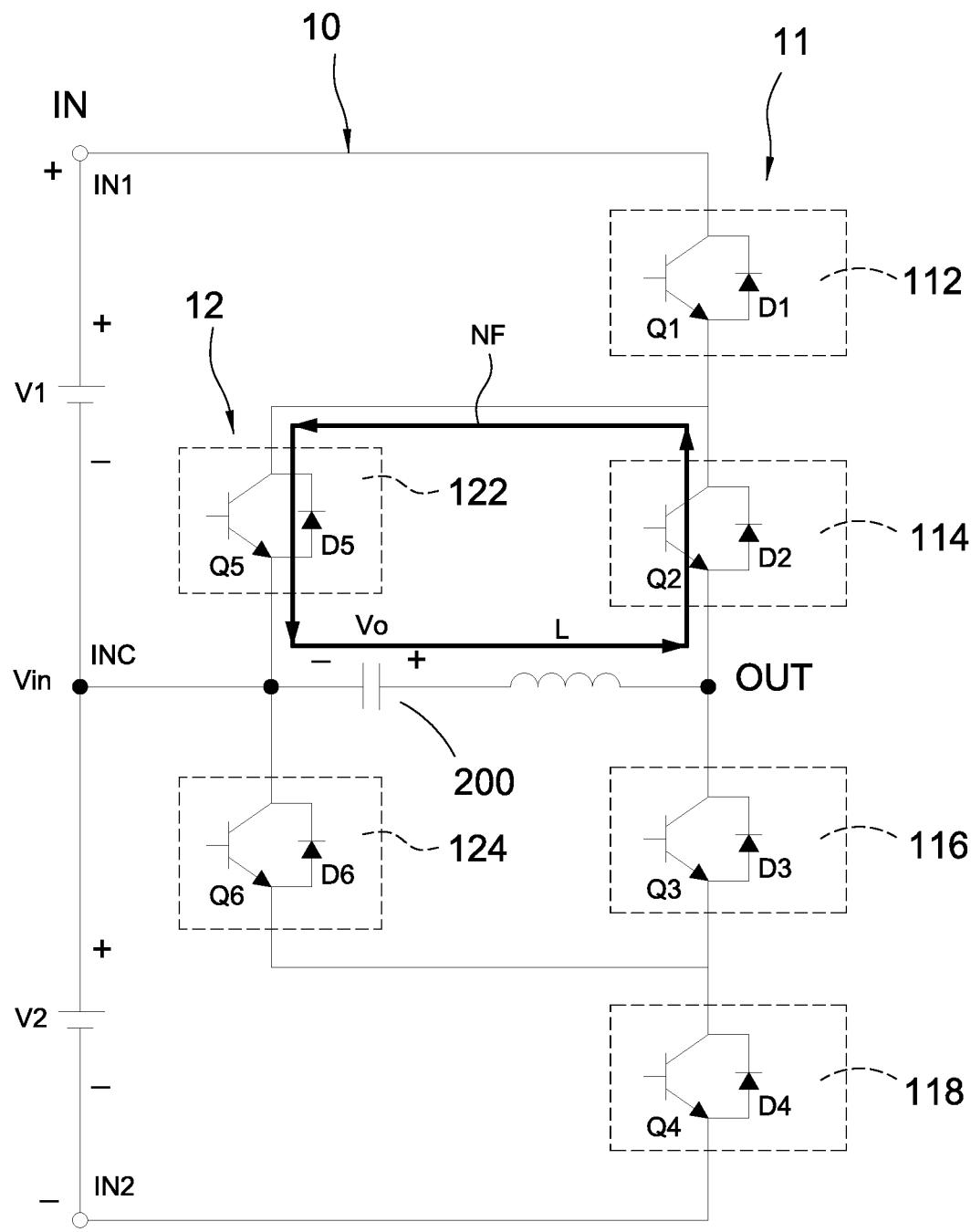
FIG. 3D is the circuit diagram of the inverter apparatus showing a freewheeling current path during the negative-half cycle according to the first control type of the present disclosure.

Please refer to FIG. 3A, which shows the circuit diagram of the inverter apparatus showing a main current path during a positive-half cycle according to the first control type of the present disclosure, FIG. 3B, which shows the circuit diagram of the inverter apparatus showing a freewheeling current path during the positive-half cycle according to the first control type of the present disclosure, FIG. 3C, which shows the circuit diagram of the inverter apparatus showing a main current path during a negative-half cycle according to the first control type of the present disclosure, and FIG. 3D, which shows the circuit diagram of the inverter apparatus showing a freewheeling current path during the negative-half cycle according to the first control type of the present disclosure, also refer to FIG. 1 and FIG. 2. When the inverter apparatus 100 operates in the normal state (i.e., not in the overcurrent state), a positive-half cycle main current path PM of the bridge arm assembly 10 is provided through the first DC power V1, the first switch unit 112, the second switch unit 114, the output inductor L, the AC power output Vo, and the first DC power V1, as shown in FIG. 3A. Also, a positive-half cycle freewheeling path PF of the bridge arm assembly 10 is provided through the output inductor L, the AC power output Vo, the sixth switch unit 124, the third switch unit 116, and the output inductor L, as shown in FIG. 3B.

When the inverter apparatus 100 operates in the normal state (i.e., not in the overcurrent state), a negative-half cycle main current path NM of the bridge arm assembly 10 is provided through the second DC power V2, the AC power output Vo, the output inductor L, the third switch unit 116, the fourth switch unit 118, and the second DC power V2, as shown in FIG. 3C. Also, a positive-half cycle freewheeling path PF of the bridge arm assembly 10 is provided through the output inductor L, the AC power output Vo, the sixth switch unit 124, the third switch unit 116, and the output inductor L, as shown in FIG. 3B. Also, a negative-half cycle freewheeling path NF of the bridge arm assembly 10 is provided through the output inductor L, the second switch unit 114, the fifth switch unit 122, the AC power output Vo, and the output inductor L, as shown in FIG. 3D.

FIG. 2 to FIG. 3D illustrate the schematic waveforms of the control signals S1-S6 and the corresponding current paths when the inverter apparatus 100 with the first control type operates in a normal state. Further, when the inverter apparatus 100 with the first control type operates in the overcurrent state, the control unit 20 appropriately controls the sequence of turning off switch elements to make the output current Io decrease. When the output current Io decreases to the predetermined lower current point, the control unit 20 appropriately controls the sequence of turning on switch elements to make the inverter apparatus 100 operates from the overcurrent state to the normal state.

Figure 4A:
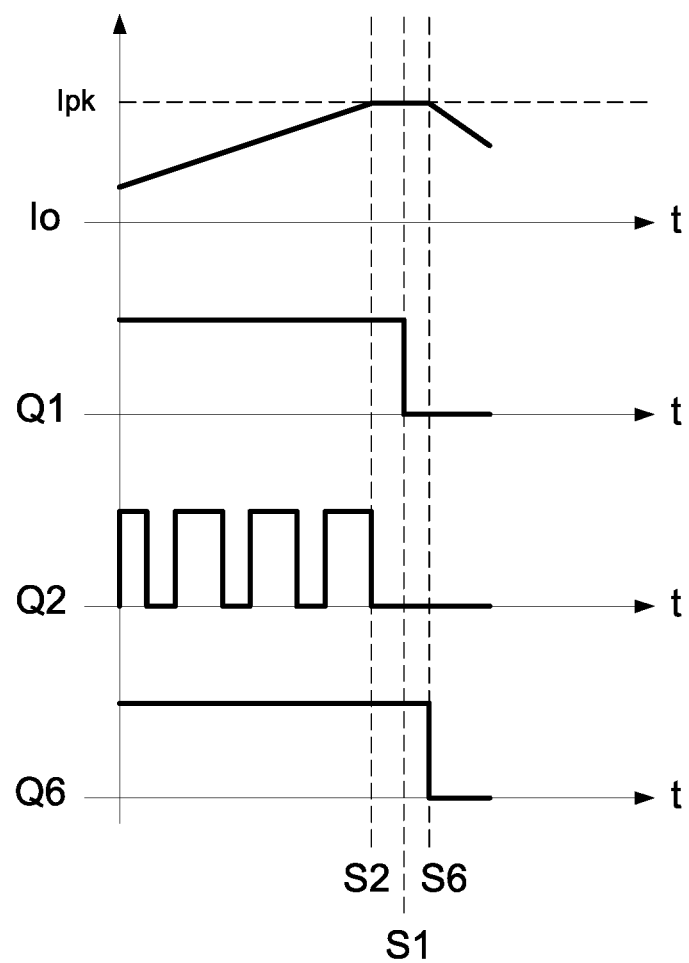
FIG. 4A is a schematic waveform of turning off switch elements in sequence during the positive-half cycle according to the first control type of the present disclosure.

Please refer to FIG. 4A, which shows a schematic waveform of turning off switch elements in sequence during the positive-half cycle according to the first control type of the present disclosure, also refer to FIG. 1-FIG. 3D. The main current path is dominated by the first switch element Q1 and the second switch element Q2, and the freewheeling path is dominated by the sixth switch element Q6 during the positive-half cycle. The control unit 20 controls the first control signal S1 of controlling the first switch element Q1 to be a first level signal, i.e., a high-level signal, controls the second control signal S2 of controlling the second switch element Q2 to be a first switching signal, i.e., a high-frequency switching signal, and controls the sixth control signal S6 of controlling the sixth switch element Q6 to be the first level signal, i.e., the high-level signal. The control unit 20 determines that the inverter apparatus 100 is in an overcurrent condition if the output current Io increases up to a predetermined current protection point Ipk. In particular, the output current Io can be acquired by sensing a current flowing through the output inductor L by a current sensor. Also, the installation position of the current sensor is not limited as long as the output current Io can be acquired. Further, an analog comparator or other digital control methods may be used to determine whether the output current Io reaches to the current protection point Ipk or not. When the control unit 20 determines that the inverter apparatus 100 is in the overcurrent condition, the control unit 20 first turns off the switch unit, i.e., the second switch element Q2 operated at high-frequency switching in the main current path to avoid the continuously increasing output current Io. After turning off the second switch element Q2, the control unit 20 further turns off the first switch element Q1, thereby turning off all switch elements in the main current path. Finally, the control unit 20 turns off the sixth switch element Q6 to disconnect the freewheeling path.

Since the fourth switch element Q4 and the third switch element Q3 in the main current path during the negative-half cycle are corresponding to the first switch element Q1 and the second switch element Q2 in the main current path during the positive-half cycle, and the fifth switch element Q5 in the freewheeling path is corresponding to the sixth switch element Q6, the sequence of turning off switch units during the negative-half cycle is that the third switch element Q3, the fourth switch element Q4, and the fifth switch element Q5 are sequentially turned off.

Further, under the overcurrent condition in the first control type, the second switch element Q2, the first switch element Q1, and the sixth switch element Q6 are sequentially turned off during the positive-half cycle, and the third switch element Q3, the fourth switch element Q4, and the fifth switch element Q5 are sequentially turned off during the negative-half cycle. The reason is that the switch element operated at high-frequency switching, such as the second switch element Q2 has probably switched several times after the first switch element Q1 is turned off but the second switch element Q2 has not been disabled (i.e., the turned-off sequence is the first switch element Q1, the second switch element Q2, and the sixth switch element Q6, or the turned-off sequence is the first switch element Q1, the sixth switch element Q6, and the second switch element Q2). At this condition, the large output current Io under the overcurrent state causes large switching loss produced from the second switch element Q2, thereby reducing efficiency and increasing the temperature of switch element.

As shown in FIG. 2, since the switching frequency of the first control signal S1 or the sixth control signal S6 is much lower than that of the second control signal S2 or the third control signal S3, the turned-on duration is longer and the number of switching the first switch element Q1 is relatively smaller. In one embodiment, the first switch element Q1 can be selected in different types than the second switch element Q2 to achieve efficiency optimization. For example, the IGBT with lower conduction loss can be selected, but significant turned-off delay and switching loss are unavoidable. If the first switch element Q1 is first turned off, the turned-off delay may make the output current Io continuously increase. In summary, it is inappropriate to provide the sequence of turning off the first switch element Q1, the second switch element Q2, and the sixth switch element Q6, or the sequence of turning off the first switch element Q1, the sixth switch element Q6, and the second switch element Q2.

If the sixth switch element Q6 is first turned off for disconnecting the freewheeling path during the positive-half cycle, the output current Io will continuously increase even though the output current Io reaches to the current protection point Ipk since the main current path has not been disconnected, thereby easily damaging electronic components inside the inverter apparatus 100. Moreover, once the second switch element Q2, which is operated at high-frequency switching, is turned off, the main current path and the freewheeling current path are disconnected. At this condition, the freewheeling current is forced to flow through the AC power output Vo, the second DC power V2, the fourth diode D4, and the third diode D3 so that the voltage stress across the second switch element Q2 is equal to the sum of the first DC power V1 and the second DC power V2. Therefore, the second switch element Q2 would be damaged unless a switch element with large (twice) withstand voltage is used to replace the original second switch element Q2. Accordingly, the problems of higher costs and less efficiency of the inverter apparatus 100 occur. In summary, it is inappropriate to control the sixth switch element Q6 first turning off.

Similarly, if the sequence of turning off the second switch element Q2, the sixth switch element Q6, and the first switch element Q1 is controlled, the freewheeling current is forced to flow through the AC power output Vo, the second DC power V2, the fourth diode D4, and the third diode D3 since the main current path and the freewheeling current path are disconnected. Therefore, the voltage stress across the second switch element Q2 is equal to the sum of the first DC power V1 and the second DC power V2. In summary, it is inappropriate to provide the sequence of turning off the second switch element Q2, the sixth switch element Q6, and the first switch element Q1. During the negative-half cycle, the control unit 20 appropriately controls the sequence of turning off the third switch element Q3, the fourth switch element Q4, and the fifth switch element Q5. The reason in detail is like the positive-half cycle and is omitted here for conciseness.

Figure 4B:
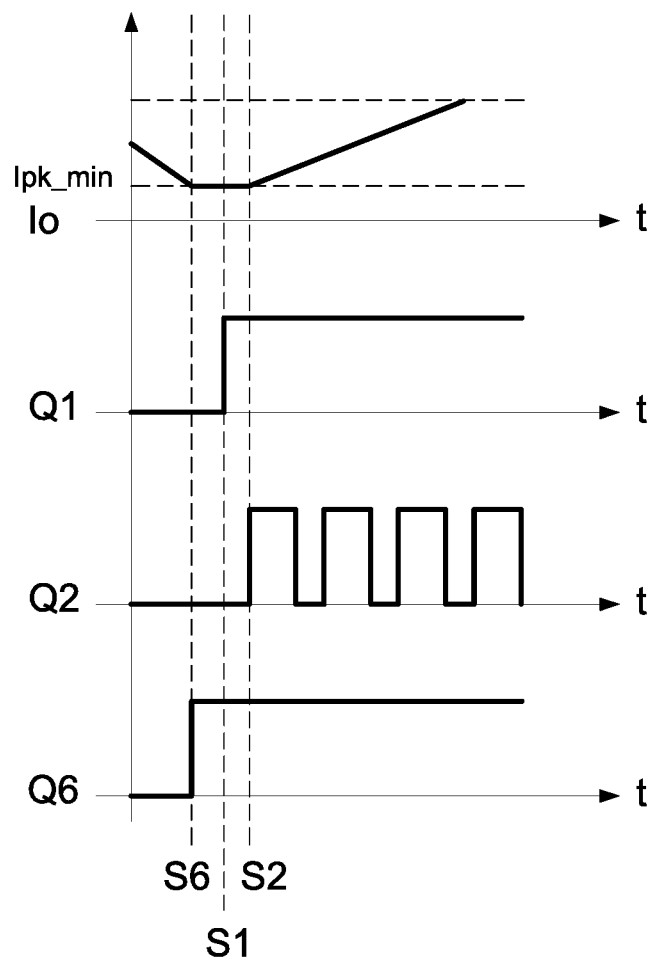
FIG. 4B is a schematic waveform of turning on switch elements in sequence during the positive-half cycle according to the first control type of the present disclosure.

Please refer to FIG. 4B, which shows a schematic waveform of turning on switch elements in sequence during the positive-half cycle according to the first control type of the present disclosure, also refer to FIG. 1-FIG. 4A. After the sixth switch element Q6 is turned off, the output current Io continuously decreases to a predetermined lower current point Ipk_min. At this condition, the switch elements can be turned on. The control unit 20 first turns on the sixth switch element Q6 to make the output current Io flow through the freewheeling path provided by the sixth switch element Q6 and the third diode D3, as shown in FIG. 3B. Afterward, the control unit 20 further turns on the first switch element Q1 and switch element(s) operated at high-frequency switching in the main current path. In other words, the second switch element Q2 is lastly turned on.

Since the fourth switch element Q4 and the third switch element Q3 in the main current path during the negative-half cycle are corresponding to the first switch element Q1 and the second switch element Q2 in the main current path during the positive-half cycle, and the fifth switch element Q5 in the freewheeling path is corresponding to the sixth switch element Q6, the sequence of turning on switch units during the negative-half cycle according to the first control type is that the fifth switch element Q5, the fourth switch element Q4, and the third switch element Q3 are sequentially turned on during the negative-half cycle.

Further, in the first control type, the sixth switch element Q6, the first switch element Q1, and the second switch element Q2 are sequentially turned on during the positive-half cycle, and the fifth switch element Q5, the fourth switch element Q4, and the third switch element Q3 are sequentially turned on during the negative-half cycle. The reason is that the main current path and the freewheeling path are not built before the first switch element Q1 is turned on when the turned-on sequence is the first switch element Q1, the sixth switch element Q6, and the second switch element Q2. At this condition, the previous freewheeling current has been forced to flow through the AC power output Vo, the second DC power V2, the fourth diode D4, and the third diode D3 so that the voltage stress across the second switch element Q2 is equal to the sum of the first DC power V1 and the second DC power V2 once the first switch element Q1 is turned on. In summary, it is inappropriate to provide the sequence of turning on the first switch element Q1, the sixth switch element Q6, and the second switch element Q2.

The reason is that when the switch element operated at high-frequency switching, such as the second switch element Q2 is first turned on during the positive-half cycle (i.e., the turned-on sequence is the second switch element Q2, the first switch element Q1, and the sixth switch element Q6, or the turned-on sequence is the second switch element Q2, the sixth switch element Q6, and the first switch element Q1), the bridge arm assembly 10 fails to stably provide a freewheeling path, and further the turned-on sequence of the switch elements may be changed to the first switch element Q1, the sixth switch element Q6, and the second switch element Q2. In summary, it is inappropriate to control the second switch element Q2 first turning on.

Similarly, if the sequence of turning on the sixth switch element Q6, the second switch element Q2, and the first switch element Q1 is controlled and the IGBT with lower conduction loss is selected to as the first switch element Q1, the first switch element Q1, which is lastly turned on, is easily damaged by the recovery current due to significant switching loss thereof. During the negative-half cycle, the control unit 20 appropriately controls the sequence of turning on the fifth switch element Q5, the fourth switch element Q4, and the third switch element Q3. The reason in detail is like the positive-half cycle and is omitted here for conciseness.

In one embodiment, a hysteresis zone designed between the current protection point Ipk and the lower current point Ipk_min is provided to avoid frequently executing the turning-off and turning-on operations of the inverter apparatus 100.

Figure 5A:
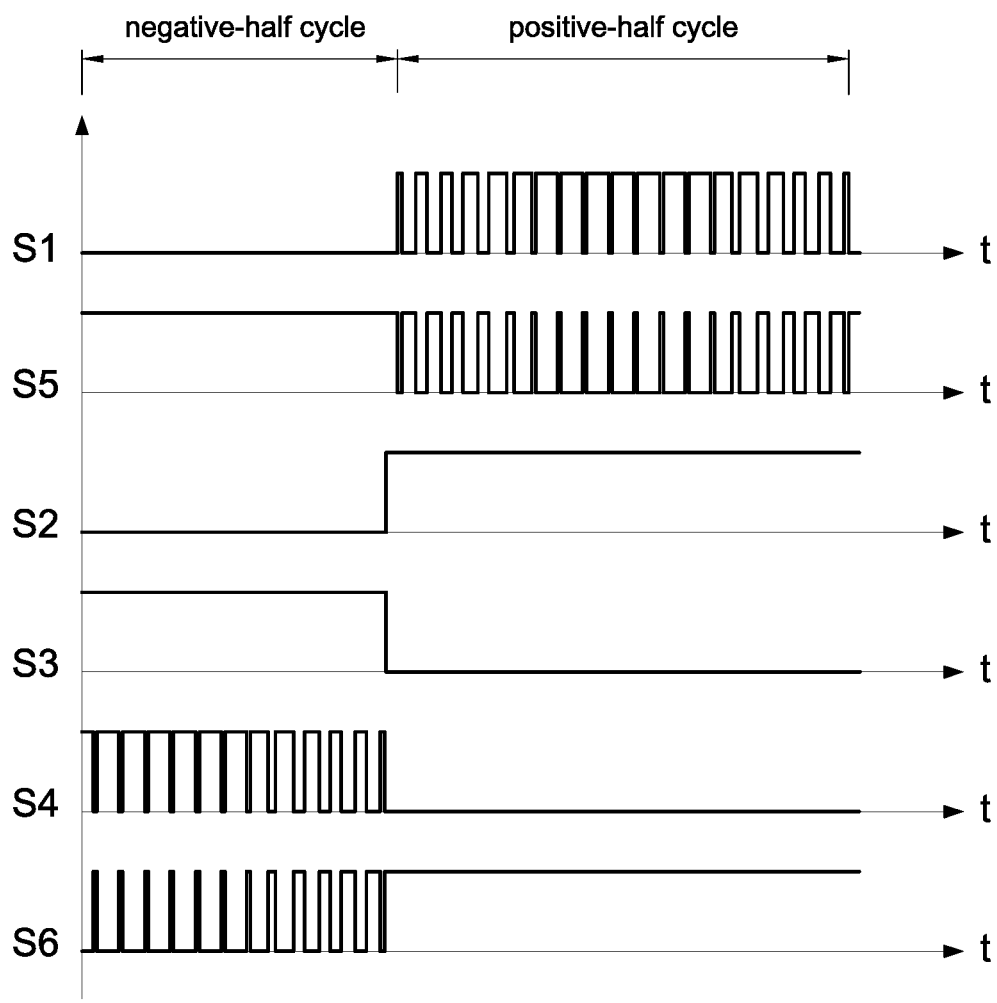
FIG. 5A is a schematic waveform of controlling the inverter apparatus according to a second control type of the present disclosure.

Please refer to FIG. 5A, which shows a schematic waveform of controlling the inverter apparatus according to a second control type of the present disclosure, also refer to FIG. 1-FIG. 4B. If the inverter apparatus 100 with the second control type operates in a normal state (i.e., not in an overcurrent state), the first control signal S1 is a first switching signal, the fifth control signal S5 is a second switching signal complementary to the first switching signal, the second control signal S2 and the sixth control signal S6 are respectively a first level signal, and the third control signal S3 and the fourth control signal S4 are respectively a second level signal during a positive-half cycle. Alternatively, the fourth control signal S4 is a third switching signal, the sixth control signal S6 is a fourth switching signal complementary to the third switching signal, the third control signal S3 and the fifth control signal S5 are respectively the first level signal, and the first control signal S1 and the second control signal S2 are respectively the second level signal during a negative-half cycle.

Figure 5B:
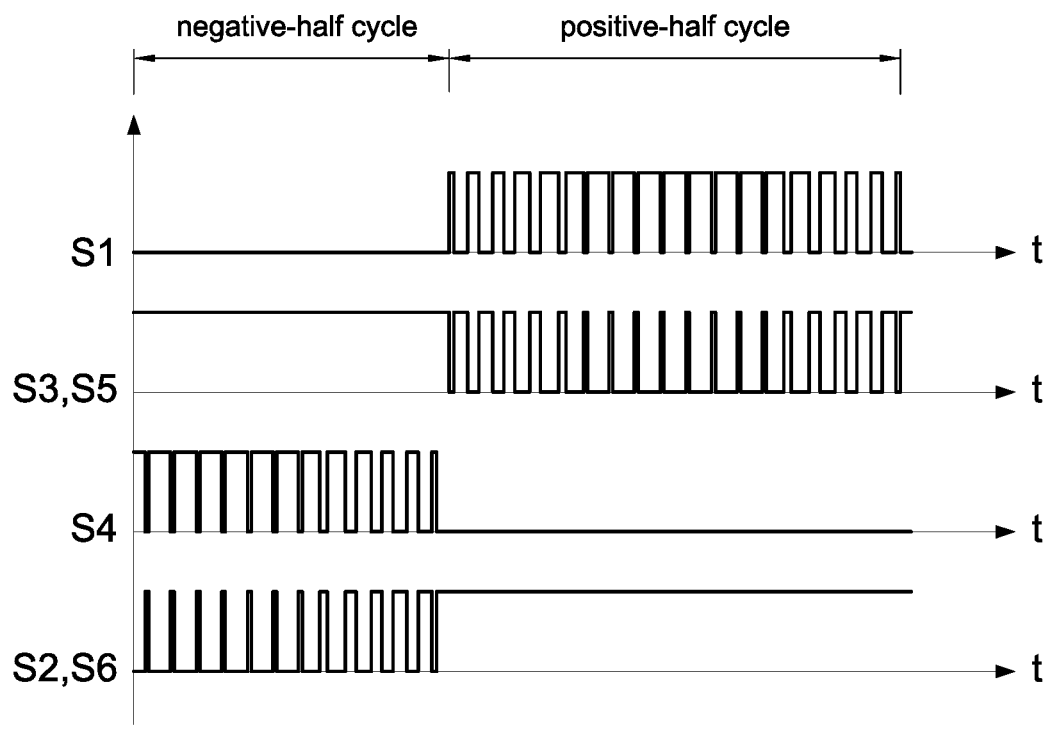
FIG. 5B is a schematic waveform of controlling the inverter apparatus according to a third control type of the present disclosure.

Please refer to FIG. 5B, which shows a schematic waveform of controlling the inverter apparatus according to a third control type of the present disclosure, also refer to FIG. 1-FIG. 5A. The major difference between the third control type shown in FIG. 5B and the second control type shown in FIG. 5A is that the third control signal S3 is the second switching signal and other control signals (S1-S2 and S4-S6) are identical in FIG. 5A when the inverter apparatus 100 operates in the normal state (i.e., not in the overcurrent state) during the positive-half cycle; the second control signal S2 is the fourth switching signal and other control signals (S1 and S3-S6) are identical in FIG. 5A when the inverter apparatus 100 operates in the normal state (i.e., not in the overcurrent state) during the negative-half cycle.

The major difference between the second control type shown in FIG. 5A, the third control type shown in FIG. 5B and the first control type shown in FIG. 2 is that the first control signal S1 and the sixth control signal S6 are the first level signal during the positive-half cycle shown in FIG. 2, and the first control signal S1 and the sixth control signal S6 are the second level signal during the negative-half cycle shown in FIG. 2; the fourth control signal S4 and the fifth control signal S5 are opposite to the first control signal S1 and the sixth control signal S6. Since the switching frequency of the control signals (S1, S4-S6) is lower than that of the second control signal S2 or the third control signal S3, the switch component, such as the IGBT with larger switching loss but less conduction loss is suitable as the switch elements Q1, Q4-Q6. Moreover, since the switching frequency of the second control signal S2 and the third control signal S3 is higher than that of the first control signal S1 or the fourth control signal S4, the switch component, such as the MOSFET with larger conduction loss but less switching loss is suitable as the switch elements Q2-Q3. Accordingly, the appropriate switch components can be used to further optimize efficiency according to the first control type shown in FIG. 2.

Figure 6A:
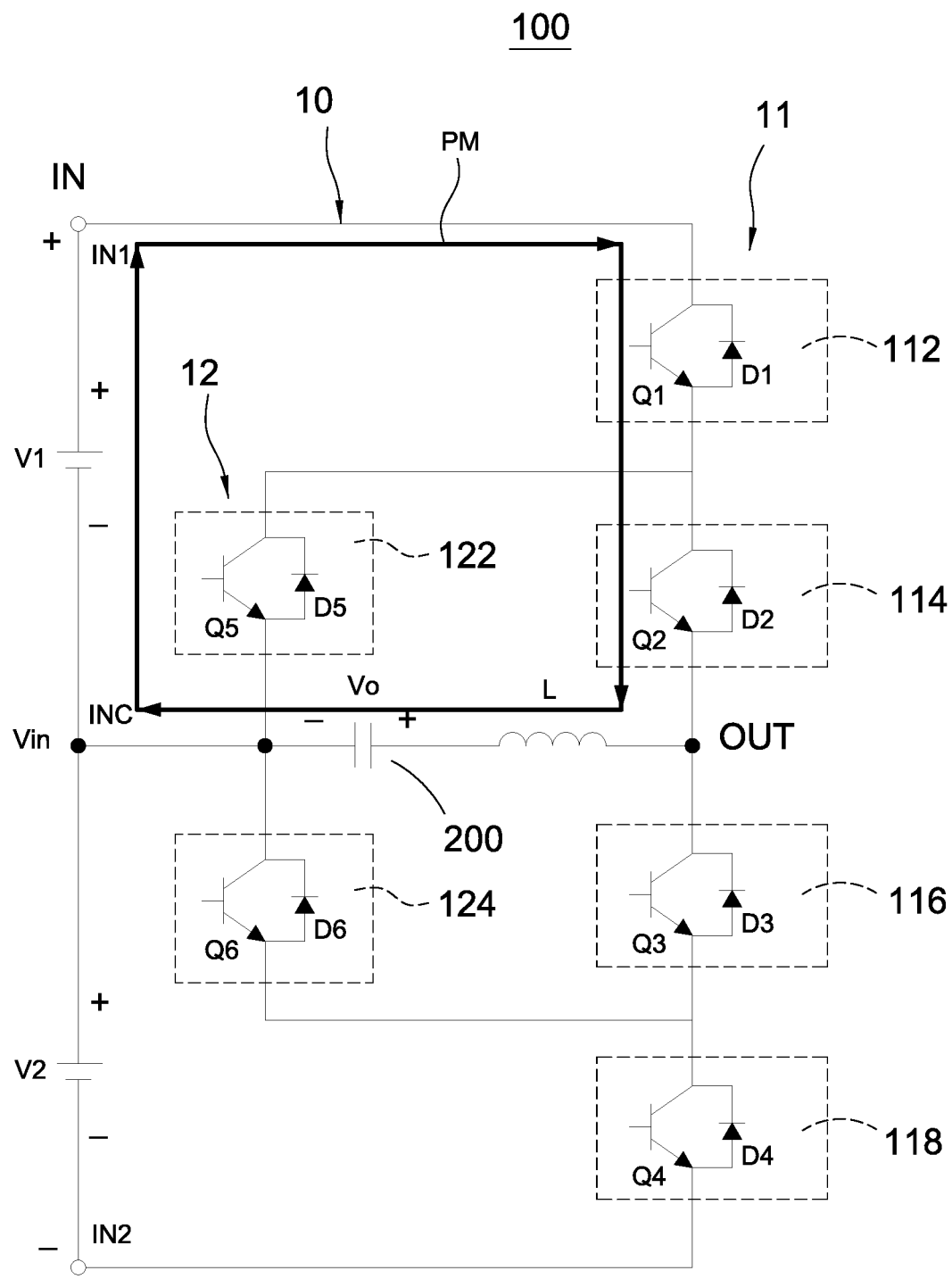
FIG. 6A is the circuit diagram of the inverter apparatus showing a main current path during a positive-half cycle according to a second control type and a third control type of the present disclosure.
Figure 6B:
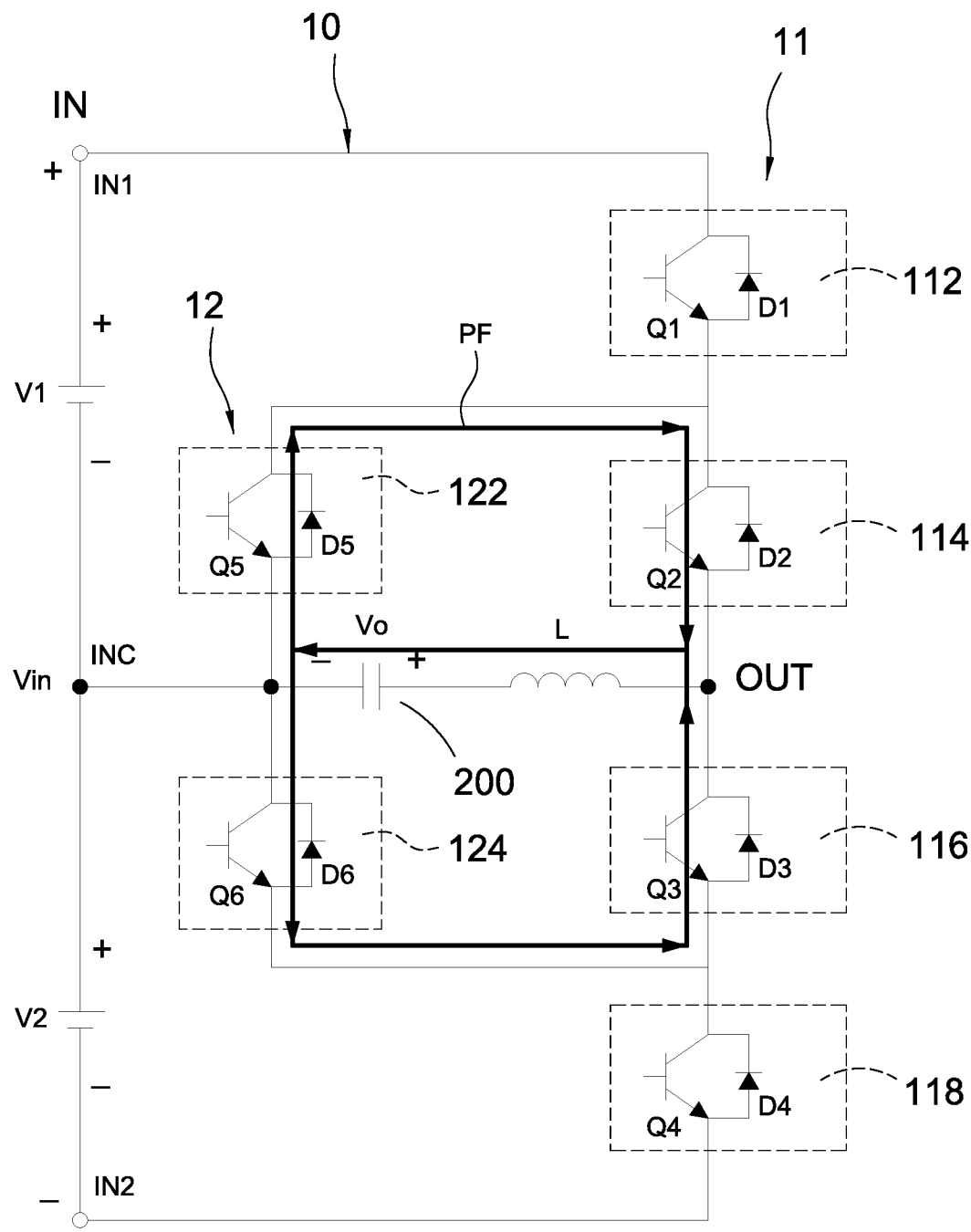
FIG. 6B is the circuit diagram of the inverter apparatus showing a freewheeling current path during the positive-half cycle according to the second control type and the third control type of the present disclosure.
Figure 6C:
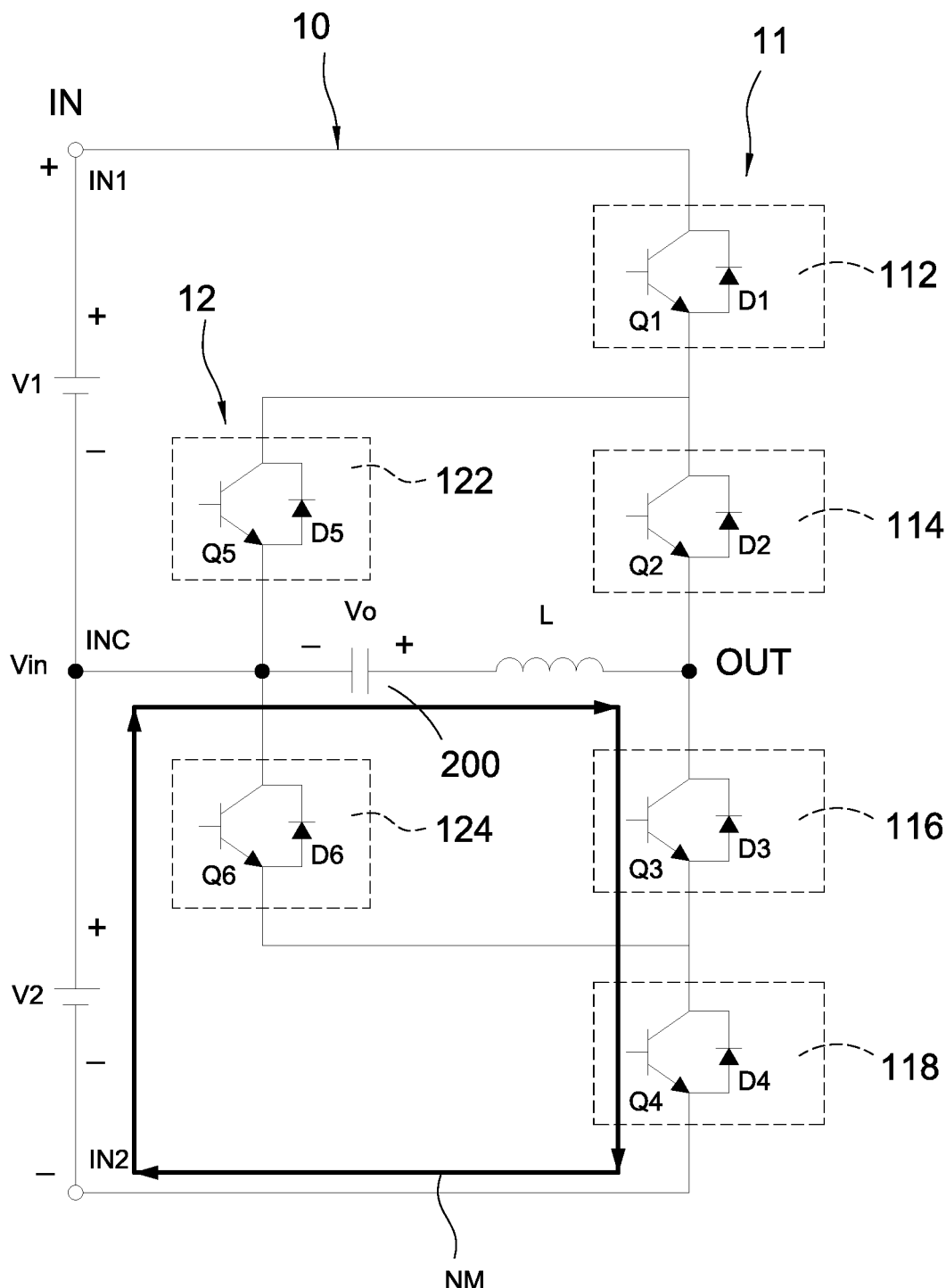
FIG. 6C is the circuit diagram of the inverter apparatus showing a main current path during a negative-half cycle according to the second control type and the third control type of the present disclosure.
Figure 6D:
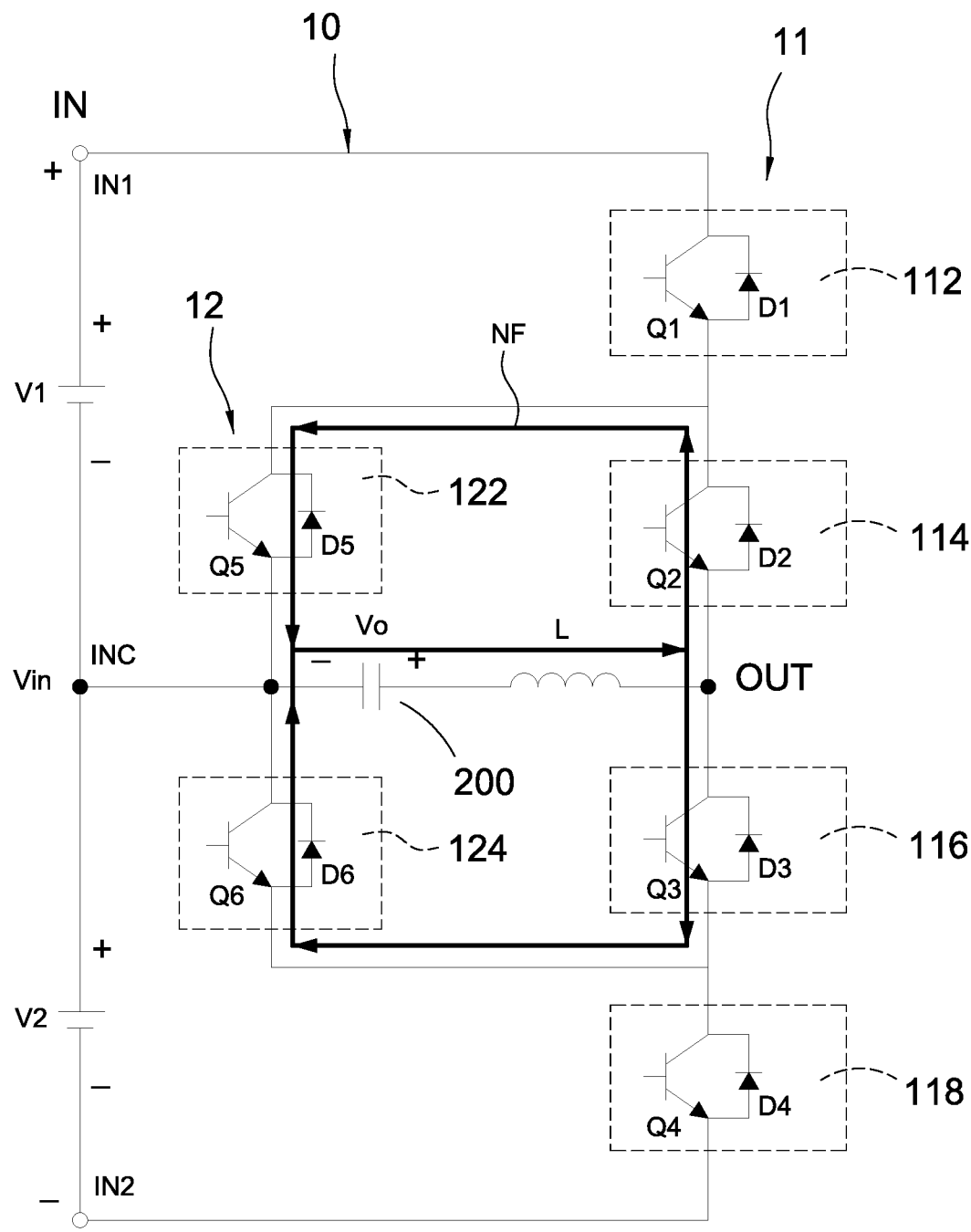
FIG. 6D is the circuit diagram of the inverter apparatus showing a freewheeling current path during the negative-half cycle according to the second control type and the third control type of the present disclosure.

Please refer to FIG. 6A, which shows the circuit diagram of the inverter apparatus showing a main current path during a positive-half cycle according to a second control type and a third control type of the present disclosure, FIG. 6B, which shows the circuit diagram of the inverter apparatus showing a freewheeling current path during the positive-half cycle according to the second control type and the third control type of the present disclosure, FIG. 6C, which shows the circuit diagram of the inverter apparatus showing a main current path during a negative-half cycle according to the second control type and the third control type of the present disclosure, and FIG. 6D, which shows the circuit diagram of the inverter apparatus showing a freewheeling current path during the negative-half cycle according to the second control type and the third control type of the present disclosure, also refer to FIG. 1-FIG. 5B. When the inverter apparatus 100 operates in the normal state (i.e., not in the overcurrent state), a positive-half cycle main current path PM of the bridge arm assembly 10 is provided through the first DC power V1, the first switch unit 112, the second switch unit 114, the output inductor L, the AC power output Vo, and the first DC power V1, as shown in FIG. 6A. Also, a positive-half cycle freewheeling path PF of the bridge arm assembly 10 is provided through the output inductor L, the AC power output Vo, the fifth switch unit 122, the second switch unit 114, and the output inductor L, and further the positive-half cycle freewheeling path PF is provided through the output inductor L, the AC power output Vo, the sixth switch unit 124, the third switch unit 116, and the output inductor L, as shown in FIG. 6B.

When the inverter apparatus 100 operates in the normal state (i.e., not in the overcurrent state), a negative-half cycle main current path NM of the bridge arm assembly 10 is provided through the second DC power V2, the AC power output Vo, the output inductor L, the third switch unit 116, the fourth switch unit 118, and the second DC power V2, as shown in FIG. 6C. Also, a negative-half cycle freewheeling path NF of the bridge arm assembly 10 is provided through the output inductor L, the AC power output Vo, the second switch unit 114, the fifth switch unit 122, and the output inductor L, as shown in FIG. 6D. Also, a negative-half cycle freewheeling path NF of the bridge arm assembly 10 is provided through the output inductor L, the second switch unit 114, the fifth switch unit 122, the AC power output Vo, and the output inductor L, and further the negative-half cycle freewheeling path NF is provided through the output inductor L, the third switch unit 116, the sixth switch unit 116, the AC power output Vo, and the output inductor L, as shown in FIG. 6D.

In detail, if the inverter apparatus 100 with the second control type operates in the positive-half cycle of the normal state (i.e., not in the overcurrent state), the third control signal S3 is a low-level signal so that the current flows through the third diode D3 due to the turned-off third switch element Q3 in the positive-half cycle freewheeling path PF. When the inverter apparatus 100 with the third control type operates in the positive-half cycle of the normal state (i.e., not in the overcurrent state), the third control signal S3 and the first control signal S1 are switched and complementary. When the first switch element Q1 is turned off in the positive-half cycle freewheeling path PF, the third switch element Q3 is turned on. If the third switch element Q3 is a bi-directional switch, the loss produced by a current flowing through the third switch element Q3 is lower than that produced by a current flowing through the third diode D3. Moreover, a current path is provided by the third switch element Q3 and a sixth diode D6 for the reactive power since the third switch element Q3 is turned on when the load 200 is an inductive load and reactive power exists (i.e., the output current Io reversely flows to the inverter apparatus 100 when the AC power output Vo is in the positive-half cycle). Similarly, when the fourth switch element Q4 is turned off in the negative-half cycle freewheeling path NF, the second switch element Q2 is turned on.

Figure 7A:
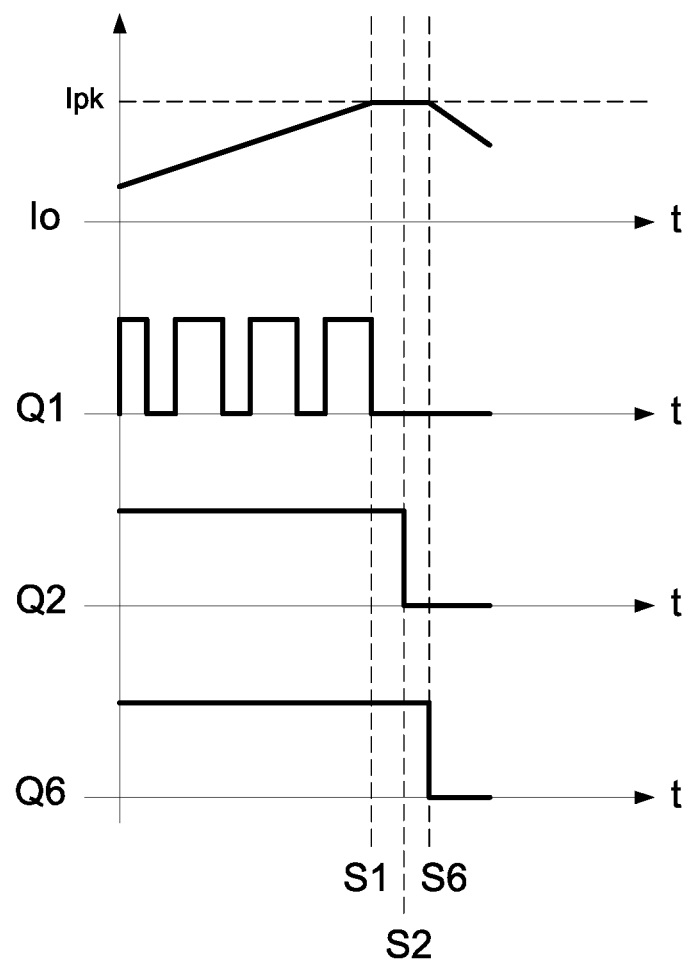
FIG. 7A is a first embodiment of turning off switch elements in sequence during the positive-half cycle according to the second control type and the third control type of the present disclosure.

Please refer to FIG. 7A, which shows a first embodiment of turning off switch elements in sequence during the positive-half cycle according to the second control type and the third control type of the present disclosure, also refer to FIG. 1-FIG. 6B. According to the second control type and the third control type, the main current path is provided by the first switch element Q1 and the freewheeling path is provided by the sixth switch element Q6 or the fifth diode D5. The control unit 20 controls the first control signal S1 of controlling the first switch element Q1 to be the first switching signal, i.e., the high-frequency switching signal, controls the second control signal S2 of controlling the second switch element Q2 to be the first level signal, i.e., the high-level signal, controls the sixth control signal S6 of controlling the sixth switch element Q6 to be the first level signal, i.e., the high-level signal. During the positive-half cycle of the AC power output Vo, the control unit 20 determines that the inverter apparatus 100 is in the overcurrent condition if the output current Io increases up to a predetermined current protection point Ipk. When the control unit 20 determines that the inverter apparatus 100 is in the overcurrent condition, the control unit 20 first turns off the switch unit, i.e., the first switch element Q1 operated at high-frequency switching in the main current path to avoid the continuously increasing output current Io. Since the freewheeling path is provided by the second switch element Q2 and the fifth diode D5 and provided by the third diode D3 and the sixth switch element Q6 as shown in FIG. 6B, the control unit 20 then turns off the second switch element Q2 (at this condition, the freewheeling path is provided by the third diode D3 and the sixth switch element Q6) and finally turns off the sixth switch element Q6.

Figure 7B:
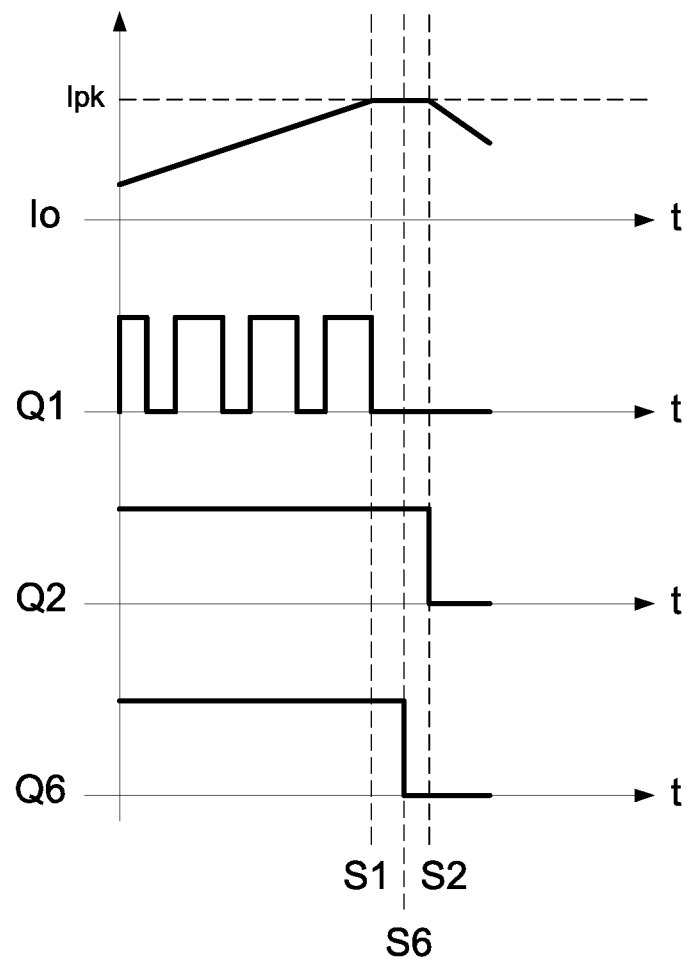
FIG. 7B is a second embodiment of turning off switch elements in sequence during the positive-half cycle according to the second control type and the third control type of the present disclosure.

Please refer to FIG. 7B, which shows a second embodiment of turning off switch elements in sequence during the positive-half cycle according to the second control type and the third control type of the present disclosure, also refer to FIG. 1-FIG. 7A. After turning off the first switch element Q1, the control unit 20 turns off the sixth switch element Q6 (at this condition, the freewheeling path is provided by the second switch element Q2 and the fifth diode D5) and finally turns off the second switch element Q2. Since the fourth switch element Q4 and the third switch element Q3 in the main current path during the negative-half cycle are corresponding to the first switch element Q1 and the second switch element Q2 in the main current path during the positive-half cycle, and the fifth switch element Q5 in the freewheeling path is corresponding to the sixth switch element Q6, so the fourth switch element Q4, the third switch element Q3, and the fifth switch element Q5, or the fourth switch element Q4, the fifth switch element Q5, and the third switch element Q3 are sequentially turned off during the negative-half cycle.

Figure 7C:
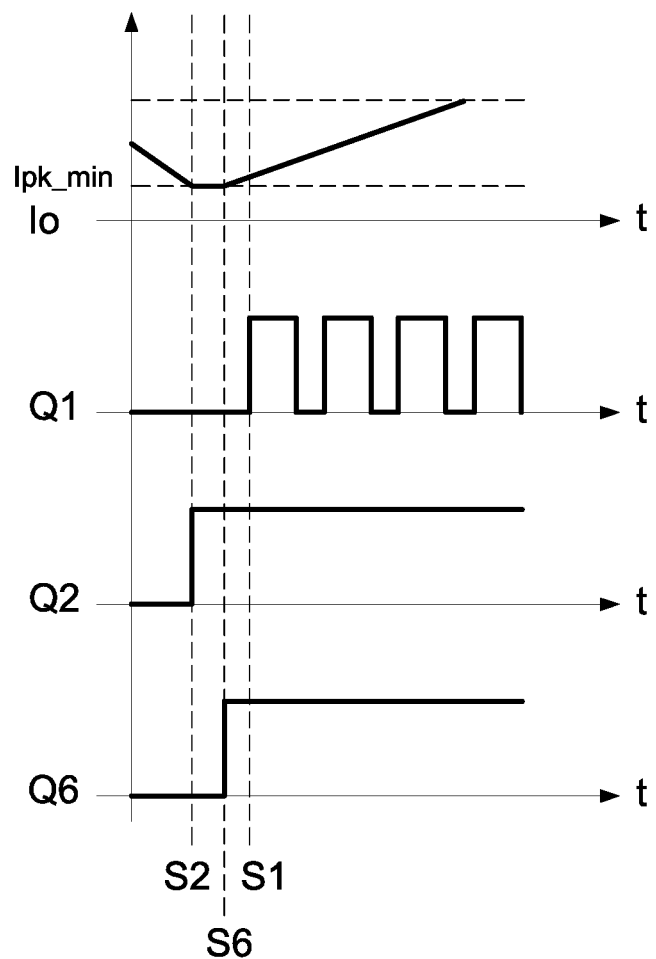
FIG. 7C is a first embodiment of turning on switch elements in sequence during the positive-half cycle according to the second control type and the third control type of the present disclosure.
Figure 7D:
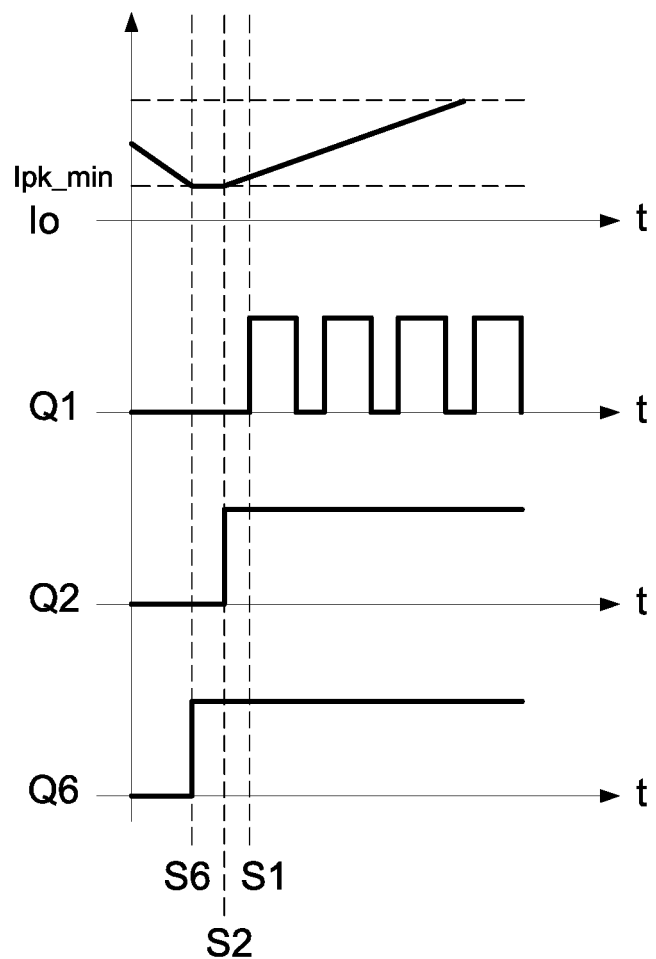
FIG. 7D is a second embodiment of turning on switch elements in sequence under the positive-half cycle according to the second control type and the third control type of the present disclosure.
Figure 7E:
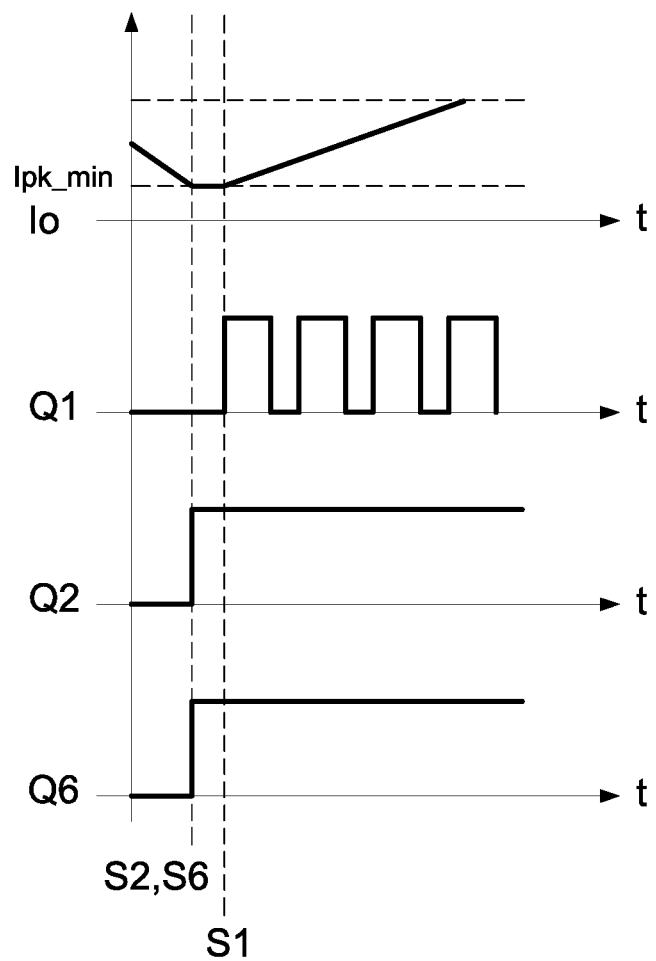
FIG. 7E is a third embodiment of turning on switch elements in sequence under the positive-half cycle according to the second control type and the third control type of the present disclosure.

Please refer to FIG. 7C, which shows a first embodiment of turning on switch elements in sequence during the positive-half cycle according to the second control type and the third control type of the present disclosure, FIG. 7D, which shows a second embodiment of turning on switch elements in sequence during the positive-half cycle according to the second control type and the third control type of the present disclosure, FIG. 7E, which shows a third embodiment of turning on switch elements in sequence during the positive-half cycle according to the second control type and the third control type of the present disclosure, also refer to FIG. 1-FIG. 7B. After all of the switches are turned off, the output current Io continuously decreases to the predetermined lower current point Ipk_min. At this condition, the switch elements can be turned on again. The control unit 20 first turns on the second switch element Q2 or the sixth switch element Q6 to make the output current Io flow through the freewheeling path provided by the second switch element Q2 and the fifth diode D5, or provided by the third diode D3 and the sixth switch element Q6, as shown in FIG. 6B. Since one freewheeling path can provide for the current without flowing through the AC power output Vo, the second DC power V2, the fourth diode D4, and the third diode D3, so the sequence for turning on the bridge arm assembly 10 during the positive-half cycle is that the second switch element Q2 is earlier than the sixth switch element Q6, or the second switch element Q2 is later than the sixth switch element Q6, or the second switch element Q2 is simultaneous with the sixth switch element Q6.

After the second switch element Q2 and the sixth switch element Q6 are turned on by the control unit 20, the freewheeling path provided by the second switch element Q2 and the fifth diode D5 and the freewheeling path provided by the third diode D3 and the sixth switch element Q6 are available. Therefore, the control unit 20 finally turns on the first switch element Q1 operated at high-frequency switching in the main current path so that the output current Io continuously increases. Moreover, the sequence of turning on switch units during the negative-half cycle is that the third switch element Q3, the fifth switch element Q5, and the fourth switch element Q4 are sequentially turned on, or the fifth switch element Q5, the third switch element Q3, and the fourth switch element Q4 are sequentially turned on, or the switch element Q3 and the fifth switch element Q5 are simultaneously turned on and then the fourth switch element Q4. The reason in detail is like the positive-half cycle and is omitted here for conciseness.

In conclusion, the present disclosure has following features and advantages:

1. The output current does not exceed the predetermined current protection point to implement the overcurrent protection.

2. The appropriate turned-off and turned-on sequence is designed to avoid damaging switch elements of the inverter apparatus from the excessive voltage stress across the switch elements.

3. The switch element operated at high-frequency switching is first turned off to avoid the continuously increasing output current once the output current reaches to the determined current protection point.

4. The switch element operated at high-frequency switching is lastly turned on to stably provide the freewheeling path in the bridge arm assembly.

5. The switch element in the freewheeling path is first turned on to avoid damaging switch elements from the excessive voltage stress across the switch elements in the main current path.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An inverter apparatus with overcurrent protection control coupled to an AC output terminal and a DC input terminal having an intermediate potential terminal, characterized in that the inverter apparatus with overcurrent protection control comprising:
   a bridge arm assembly comprising:
   a first bridge arm comprising a first switch element, a second switch element, a third switch element, and a fourth switch element sequentially connected in series; the AC output terminal coupled to the second switch element and the third switch element so that a first terminal of the DC input terminal coupled to the AC output terminal through the first switch element and the second switch element, and a second terminal of the DC input terminal coupled to the AC output terminal through the fourth switch element and the third switch element;
   a second bridge arm comprising a fifth switch element and a sixth switch element connected in series; the intermediate potential terminal coupled to the fifth switch element and the sixth switch element so that the intermediate potential terminal coupled to the AC output terminal through the fifth switch element and the second switch element, and the intermediate potential terminal coupled to the AC output terminal through the sixth switch element and the third switch element; and
   a control unit configured to provide a plurality of control signals to control the bridge arm assembly; when the control unit determining that the inverter apparatus with overcurrent protection control being in an overcurrent state, the control unit configured to sequentially turn off the second switch element, the first switch element, and the sixth switch element during a positive-half cycle, and sequentially turn off the third switch element, the fourth switch element, and the fifth switch element during a negative-half cycle.

2. The inverter apparatus with overcurrent protection control in claim 1, wherein the control signals comprises a first control signal of controlling the first switch element, a second control signal of controlling the second switch element, a third control signal of controlling the third switch element, a fourth control signal of controlling the fourth switch element, a fifth control signal of controlling the fifth switch element, and a sixth control signal of controlling the sixth switch element.

3. The inverter apparatus with overcurrent protection control in claim 2, wherein in a non-overcurrent state, the control unit is configured to control the second control signal to be a first switching signal, the third control signal to be a second switching signal, the first control signal and the sixth control signal to be a first level signal, and the fourth control signal and the fifth control signal to be a second level signal during the positive-half cycle; in the non-overcurrent state, the control unit is configured to control the second control signal to be a third switching signal, the third control signal to be a fourth switching signal, the fourth control signal and the fifth control signal to be the first level signal, and the first control signal and the sixth control signal to be the second level signal, wherein a level value of the first level signal is higher than a level value of the second level signal during the negative-half cycle.

4. The inverter apparatus with overcurrent protection control in claim 3, wherein the control unit is configured to turn on the sixth switch element earlier than the second switch element during the positive-half cycle, and turn on the fifth switch element earlier than the third switch element during the negative-half cycle.

5. The inverter apparatus with overcurrent protection control in claim 4, wherein the control unit is configured to turn on the first switch element later than the sixth switch element and the first switch element earlier than the second switch element during the positive-half cycle, and turn on the fourth switch element later than the fifth switch element and the fourth switch element earlier than the third switch element during the negative-half cycle.

6. An inverter apparatus with overcurrent protection control coupled to an AC output terminal and a DC input terminal having an intermediate potential terminal, characterized in that the inverter apparatus with overcurrent protection control comprising:
   a bridge arm assembly comprising:
   a first bridge arm comprising a first switch element, a second switch element, a third switch element, and a fourth switch element sequentially connected in series; the AC output terminal coupled to the second switch element and the third switch element so that a first terminal of the DC input terminal coupled to the AC output terminal through the first switch element and the second switch element, and a second terminal of the DC input terminal coupled to the AC output terminal through the fourth switch element and the third switch element;

a second bridge arm comprising a fifth switch element and a sixth switch element connected in series; the intermediate potential terminal coupled to the fifth switch element and the sixth switch element so that the intermediate potential terminal coupled to the AC output terminal through the fifth switch element and the second switch element, and the intermediate potential terminal coupled to the AC output terminal through the sixth switch element and the third switch element; and a control unit configured to provide a plurality of control signals to control the bridge arm assembly; when the control unit determining that the inverter apparatus with overcurrent protection control being in an overcurrent state, the control unit configured to turn off the first switch element earlier than the sixth switch element during a positive-half cycle, and turn off the fourth switch element earlier than the fifth switch element during a negative-half cycle; when the control unit determining that the inverter apparatus with overcurrent protection control being not in the overcurrent state, the control unit configured to turn on the sixth switch element earlier than the first switch element during the positive-half cycle, and turn on the fifth switch element earlier than the fourth switch element during the negative-half cycle.

7. The inverter apparatus with overcurrent protection control in claim 6, wherein the control signals comprises a first control signal of controlling the first switch element, a second control signal of controlling the second switch element, a third control signal of controlling the third switch element, a fourth control signal of controlling the fourth switch element, a fifth control signal of controlling the fifth switch element, and a sixth control signal of controlling the sixth switch element.

8. The inverter apparatus with overcurrent protection control in claim 7, wherein in a non-overcurrent state, the control unit is configured to control the first control signal to be a first switching signal, the fifth control signal to be a second switching signal, the second control signal and the sixth control signal to be a first level signal, and the fourth control signal to be a second level signal during the positive-half cycle; in the non-overcurrent state, the control unit is configured to control the fourth control signal to be a third switching signal, the sixth control signal to be a fourth switching signal, the third control signal and the fifth control signal to be the first level signal, and the first control signal to be the second level signal during the negative-half cycle, wherein a level value of the first level signal is higher than a level value of the second level signal.

9. The inverter apparatus with overcurrent protection control in claim 8, wherein in the non-overcurrent state, the control unit is configured to control the third control signal to be the second level signal during the positive-half cycle; in the non-overcurrent state, the control unit is configured to control the second control signal to be the second level signal during the negative-half cycle.

10. The inverter apparatus with overcurrent protection control in claim 8, wherein in the non-overcurrent state, the control unit is configured to control the third control signal to be the second switching signal during the positive-half cycle; in the non-overcurrent state, the control unit is configured to control the second control signal to be the fourth switching signal during the negative-half cycle.

11. The inverter apparatus with overcurrent protection control in claim 7, wherein the control unit is configured to turn off the second switch element earlier than the sixth switch element and the second switch element later than the first switch element, or the second switch element later than the sixth switch element during the positive-half cycle, and turn off the third switch element earlier than the fifth switch element and the third switch element later than the fourth switch element, or the third switch element later than the fifth switch element during the negative-half cycle.

12. The inverter apparatus with overcurrent protection control in claim 7, wherein the control unit is configured to turn on the second switch element earlier than the sixth switch element, or the second switch element later than the sixth switch element and the second switch element earlier than the first switch element, or the second switch element simultaneous with the sixth switch element during the positive-half cycle, and turn on the third switch element earlier than the fifth switch element, or the third switch element later than the fifth switch element and the third switch element earlier than the fourth switch element, or the third switch element simultaneous with the fifth switch element during the negative-half cycle.

* * * * *